Aug. 2, 1938.　　　E. HOCHSCHWENDER ET AL　　　2,125,343
COLUMN CONTAINING FILLER BODIES
Filed April 11, 1936　　　3 Sheets-Sheet 1

Ernst Hochschwender
Hans Thomssen
INVENTORS

BY *Hutz and Joslin*
ATTORNEYS

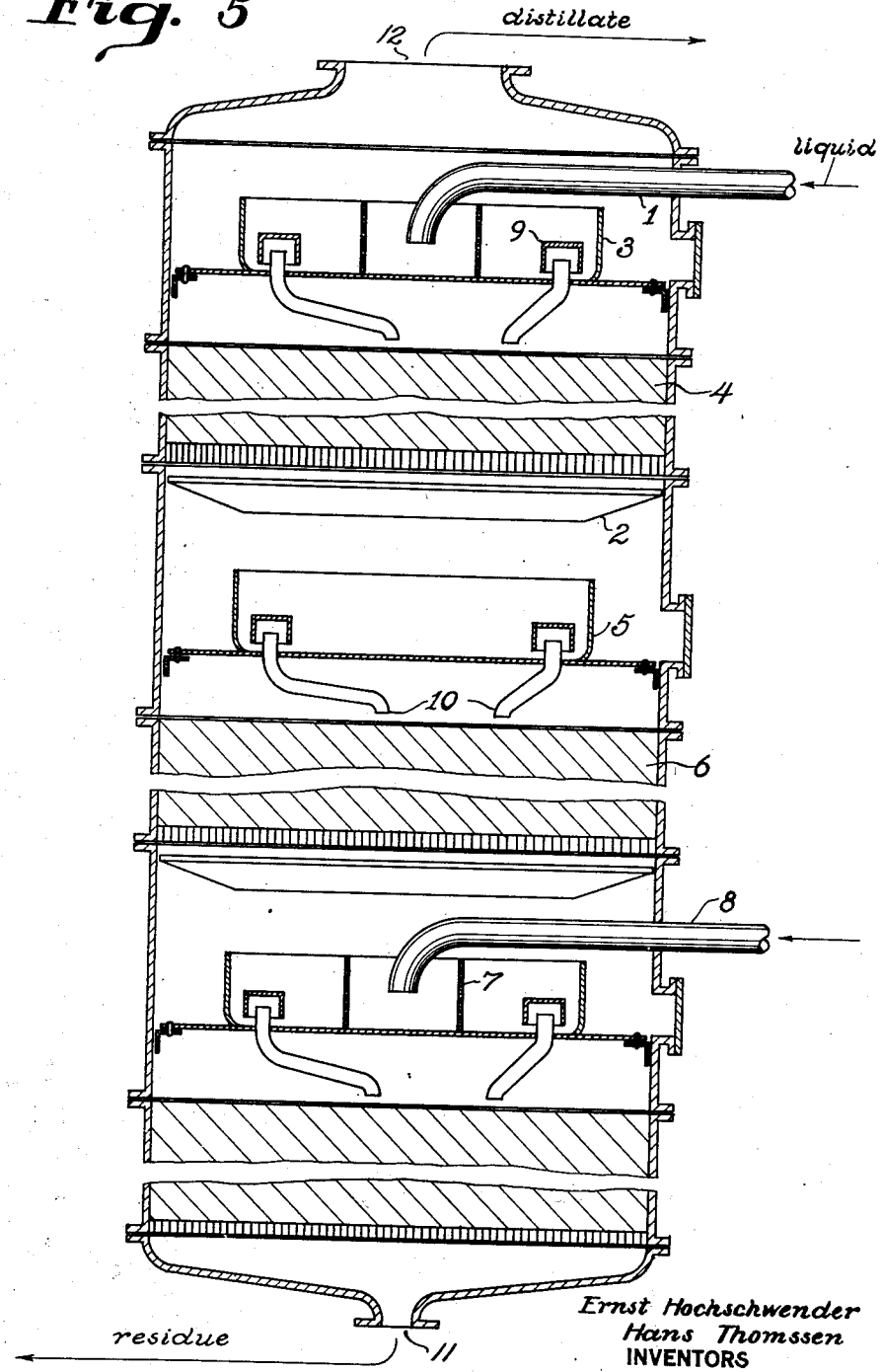

Aug. 2, 1938.  E. HOCHSCHWENDER ET AL  2,125,343
COLUMN CONTAINING FILLER BODIES
Filed April 11, 1936  3 Sheets-Sheet 3

Ernst Hochschwender
Hans Thomssen
INVENTORS

Patented Aug. 2, 1938

2,125,343

UNITED STATES PATENT OFFICE 2,125,343

COLUMN CONTAINING FILLER BODIES

Ernst Hochschwender and Hans Thomssen, Leuna, Germany, assignors to I. G. Farbenindustrie Aktiengesellschaft, Frankfort-on-the-Main, Germany Application April 11, 1936, Serial No. 73,971
In Germany April 18, 1935

5 Claims. (Cl. 261—95)

The present invention relates to improvements in columns containing filler bodies and adapted for distributing liquids passing therethrough.

It is already known that in columns containing filler bodies the distribution of liquid with increasing height of trickling is liable to vary so that in the lower parts a successively increasing portion of the liquid streams at or near the wall of the column until finally, when the height of trickling is sufficient, the whole liquid runs down at the column wall. It is therefore necessary, after a certain height of trickling, to carry out a fresh distribution of the downwardly flowing liquid. It has been proposed for the purpose of obtaining a uniform charging of the column which in the case of distilling columns ensures a good fractionation of the product to be distilled, to employ columns containing filler bodies in which there are distribution plates with overflow devices distributed over the whole plates.

In the hitherto customary construction of the plates which are rigidly secured to the column wall and which have overflow devices distributed over the whole plates, it has been found that in spite of careful assembly, the charging of the overflow devices is not uniform in operation for the following reasons:—

(1) The plates in the column have a higher temperature in operation than the walls of the column so that thermal expansion deforms the plates and the edges of the overflow devices no longer lie in a single horizontal plane;

(2) The plates themselves are also subjected to thermal stresses which cause the same result; and (3) When the liquid is supplied by a central pipe, the level of liquid on the plates may be lower towards the centre than at the edge so that the overflow devices at the edge are charged with a greater amount of liquid than those arranged towards the centre.

We have now found that it is advantageous to employ columns containing filler bodies which are provided with distributing plates having the form of cylindrical troughs about coaxial with the column and arranged on suitable supports while avoiding rigid connection with the wall of the column so that they may expand, the distributing plates containing overflow devices regularly arranged around the axis. The outlets of the overflow devices are evenly distributed over the whole area of the column of the plates so that all the overflow devices are equally or approximately equally removed from the axis.

The nature of the invention will be further described with reference to the accompanying drawings which show by way of example arrangements in accordance with the invention but the invention is not restricted to the arrangements shown.

Figure 5 is a sectional elevation of a whole column particularly adapted for the distillation of a raw material, as for example a mixture of liquid hydrocarbons.

Figure 7 shows a sectional elevation of an overflow device which is not provided with slits while Figure 8 shows a sectional elevation of an overflow device which is provided with such slits.

Figure 2:
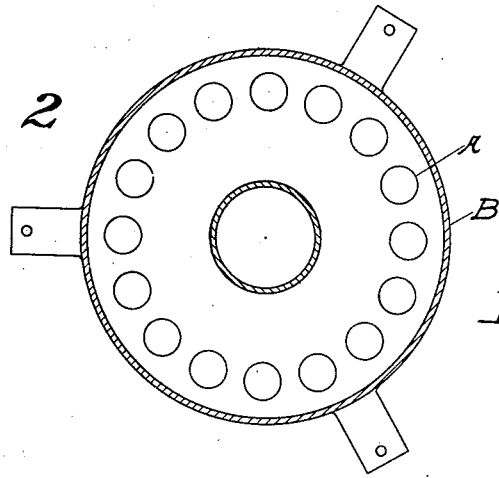
Figures 2 and 3 are plan views of the plate showing two methods of arranging the overflow devices.

Referring to Figure 2, the arrangement of the overflow devices A on a circle concentric to the axis of the column permits of a uniform distribution of liquid in spite of the said influence because the deformation (expansions and contractions) by thermal stresses as well as the alterations in the level of liquid on the plate also take place regularly around the axis of the column.

Figure 3:
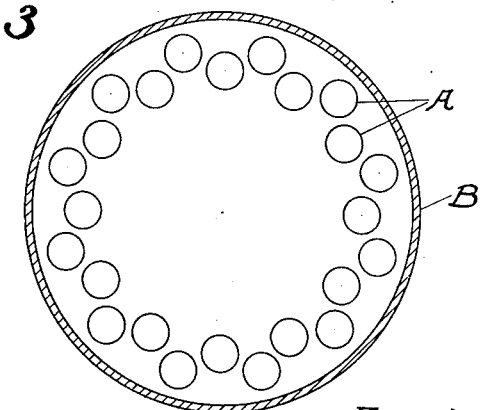

When the amount of the downwardly flowing liquid is very great, the overflow devices A may be arranged on two or more concentric circles. Care must be taken, however, that the circles are as near to each other as possible and the overflow devices A are arranged alternately as shown in Figure 3.

Figure 1:
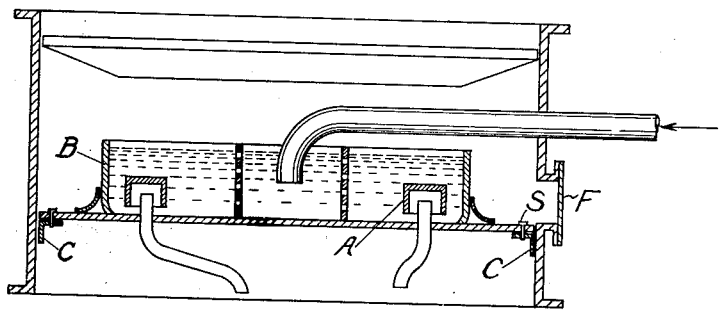
Figure 1 is a sectional elevation showing one of the plates in the column, the liquid being introduced through a pipe L.

In order to obviate the effect of the colder column wall not only by the equalizing effect of the above defined arrangement of the overflow devices, the plates are constructed according to the invention in the form of troughs B which are free to expand, as for example so that they may be loosely placed on a number of (as for example three) supports C which are rigidly secured to the column wall as shown in Figure 1. Furthermore the trough B may be readily straightened by the use of three adjusting screws S which may be rendered readily accessible by means of flanges F.

Finally in order that the deformation of the trough may be reduced to a minimum, it is constructed as resistant as possible by the suitable selection of the constructional material, as for example cast iron, and by the shaping of the same, as for example by strong ribs or stays.

Figure 4:
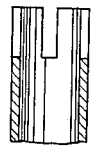
Figure 4 is a sectional elevation of a modified upper end of an overflow device.

Referring to Figure 4, the sensitivity of the trough to inclination may be reduced by the provision of slits in the overflow devices. This is of special advantage when the load on the column is light, i. e. when the amount of reflux is small.

Referring to Figure 5, the uppermost trough 3 receives a reflux from a supply pipe 1. An annular plate 2 (as in the lower parts of the column) directing the liquid from the walls more into the interior of the column is therefore not necessary above the said trough. The liquid passes from trough 3 through concentrically arranged overflow devices into the first layer of filler bodies 4 and from thence into a second trough 5, an annular plate 2 arranged directly below the said layer preventing the liquid from flowing through the space between the trough 5 and the wall of the column. The liquid flows from this trough into a second layer of filler bodies 6. This second trough therefore has the function of regulating the distribution of the liquid in the column and need not be provided with a supply pipe introducing further liquid from outside into the column; but a subsequent (for example third or fourth) trough may be provided with such further supply pipe 8, for example for the purpose of introducing a raw material which is to be distilled in the column.

It is of advantage to arrange the overflow devices of the single troughs on one circle only which is concentric to the axis of the column, but when the amount of downwardly flowing liquid is very great the overflow devices may also be arranged on two or more circles which should be as near as possible. The irregularities of the distribution of liquid resulting from such arrangement are so small that they may be neglected and that also in this case good results are obtained.

Only the overflow devices 9 in the single troughs, but not the outlets of the pipes 10 extending from the overflow devices down to the spaces filled with filler bodies must be arranged regularly around the axis of the column as is also shown in Figure 1. The said outlets are evenly distributed over the whole area of the column.

The troughs into which liquid is introduced from a supply pipe may be provided with a sieve 7 preventing solid matter from being passed through the column and giving rise to troubles in the operation.

Residue may be withdrawn through outlet 11. Part of the condensed distillate may be supplied to the upper supply pipe 1. The vapors are withdrawn through opening 12.

Figure 6:
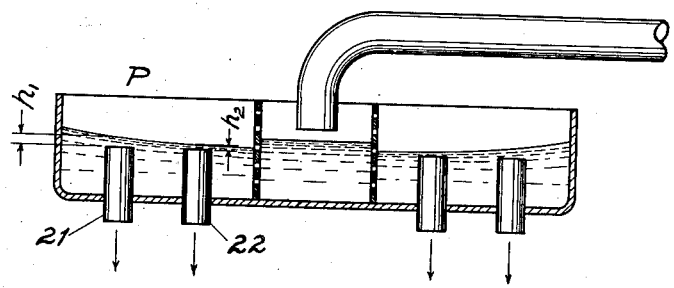
Figure 6 is a sectional elevation of a trough into which liquid is supplied by a central pipe and from which the liquid flows through overflow devices which are out of concentric arrangement.

Figure 6 shows the height of the liquid in a trough into the centre of which liquid is filled and which is provided with overflow devices 21 and 22 which are not equally removed from the axis. The speed of the liquid flowing to the wall of the trough is reduced towards the wall since the outer parts of the trough have a larger volume than the inner parts. The said reduction in the speed is converted into a higher pressure which effects a gradual rise of the level towards the wall, so that the level does not represent a horizontal plane but a parabolic plane as shown by line P. Since the heights ($h_1$ and $h_2$) of the liquid at two overflow devices 21 and 22 having a substantially different distance from the axis of the trough are different also the amounts of liquid flowing through these overflow devices are different.

Figures 7, 8:
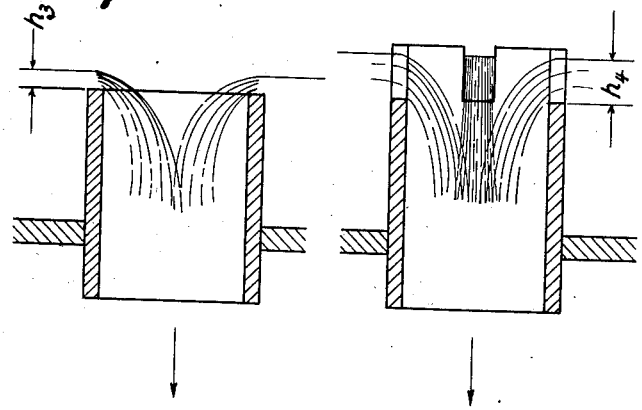

It may occur that after some time of operation a column loses its vertical position. In this case the upper edges of the overflow devices of a trough are not situated in a horizontal plane and consequently different amounts of liquid pass through the single overflow devices. If the liquid flows over the said upper edges the height of the liquid above these edges is only small ($h_3$ in Figure 7) and therefore even a small inclination may cause remarkable irregularities. But if the liquid flows through slits arranged in the overflow devices (see Figure 8) the height of the liquid above the bottom of the slits is considerably greater ($h_4$), and thus the distribution of the liquid is made considerably less sensitive to irregularities occurring in the course of the operation.

What we claim is:—

1. A column containing filler bodies which is provided with distributing plates in the form of cylindrical troughs arranged at intervals between a plurality of layers of filler bodies and the axis of which practically coincides with that of said column, each trough being devoid of rigid connection with the wall of the column and each comprising a circular side wall and a bottom plate completely occupying the space defined by said side wall and provided with one series of separated tubular overflow devices spaced inwardly from said side wall and arranged on a circle concentric with the axis of the trough so that the overflow devices of said series are equally distant from said axis, the outlets of the overflow devices of said series being evenly distributed over the whole area of the column.

2. A column operable with liquids and having a plurality of distributing means therein, a layer of filler material interpolated between each said means, each said means comprising a cylindrical trough defined by a bottom wall and a circular side wall, means for adjustably mounting each trough from said column and a plurality of tubular overflow devices arranged in the bottom wall of each trough on a circle spaced inwardly from said side wall and concentric with the axis of the trough, said overflow devices projecting above and below said bottom wall, the portions above being perpendicular to said bottom wall and the portions below being at an inclination thereto.

3. A column as claimed in claim 1, in which the troughs are arranged on supports rigidly secured to the wall of the column.

4. A column as claimed in claim 1, in which the troughs are straightened by means of adjusting screws to supports rigidly secured to the wall of the column.

5. A column as claimed in claim 1, in which the overflow devices are provided with vertical slits.

ERNST HOCHSCHWENDER.
HANS THOMSSEN.